July 17, 1956

W. L. ENGHAUSER 2,754,705

PIPE CLOSING APPARATUS

Filed Nov. 14, 1951

INVENTOR.
Winford L. Enghauser.
BY
Wood, Herron & Evans.
ATTORNEYS.

W. L. ENGHAUSER 2,754,705

PIPE CLOSING APPARATUS

Filed Nov. 14, 1951

INVENTOR.
Winford L. Enghauser.
BY
Wood, Herron & Evans.
ATTORNEYS.

United States Patent Office 2,754,705
Patented July 17, 1956

2,754,705

PIPE CLOSING APPARATUS

Winford L. Enghauser, Cincinnati, Ohio, assignor to Enghauser Manufacturing Company, Inc., a corporation of Ohio Application November 14, 1951, Serial No. 256,271

3 Claims. (Cl. 78—89)

This invention relates to a machine for, and a method of, producing individual pieces of metal pipe, each having one closed end. Such closed end pieces of metal pipe are used for manifolds on gas ranges and for numerous other purposes throughout industry. In the past, there have been two methods of closing pipe ends in general use. One has been to screwthread a cap over the pipe end to close it. This method, however, requires an extra part, that is, the cap, as well as threading operations and application of the cap. Further, unless the machine work is perfect, the joint is less than gas tight. The other method has been to close the pipe end by a spinning operation.

The present inventor developed an apparatus for closing pipes by the spinning method as disclosed in the prior patent of Winford L. Enghauser, No. 1,939,770, issued December 19, 1933. This prior machine has been used continuously since its development in closing pipes at a rapid production rate and operates upon the principle of forcing a swaging tool into frictional engagement with the spinning pipe. The heat developed by the frictional engagement of the spinning tool renders the end of the pipe sufficiently malleable to allow the metal to be swaged into a rounded end wall. While this machine has been considered highly successful, it is subject to two objectionable characteristics; first, it is obviously limited to the production of a single length of closed pipe upon each operation, and secondly, a certain percentage of the pipes so produced contain minute leaks in the end closure and require hand welding in order to be marketable.

The method of producing closed end pipes of the present invention comprises severing one long piece of pipe into two shorter pieces in a manner which closes the pipe ends as an incident to the severing. Thus, inherently the method and machine of this invention have twice the rate of production of the previously known methods and machines and, further, the severing itself is performed more rapidly.

The method which the machine utilizes is to heat the central portion of the pipe until the metal is malleable, to rotate the pipe rapidly, the rotative motion being imparted at each end, whereby no rotative thrust is transmitted through the malleable portion, and then progressively constricting the malleable center of the length of pipe, the area of constriction becoming less and less as the degree of constriction increases. For accomplishing this constriction, I utilize two rotary swaging dies, each of substantially greater diameter than the pipe, each decreasing in width as it increases in height. The two dies are identical but disposed on opposite sides of the pipe, the angularity of the positioning of the dies being 180°, and the direction of rotation being the same for each die. The pipe positioned between these two dies is rotated at a speed whereby lineal velocity of the pipe at the beginning of the operation is greater than the lineal velocity of the dies.

When the dies are rotated, their surfaces commence to depress or constrict the malleable pipe wall over a lineal extent which is substantial, in the sense of being equal to or greater than the diameter of the pipe. As the dies continue to rotate, the constriction of the pipe wall toward the center is increased, but the lineal extent of the constriction is decreased, whereby a conical or round shape is imparted to the malleable wall. This action swages the metal of the originial pipe wall into the conical or round pipe ends thereby maintaining a thickness for the pipe end at least equal to the thickness of the pipe wall. This constriction is continued until the two die surfaces meet, or almost meet, to pinch off the pipe center into two closed end walls. The lineal extent of the constriction decreases progressively from beginning to end of the operation, but it is not necessary or desirable that the lineal extent of the constriction of the die at the pinch-off be reduced all the way to a knife edge, as it is the purpose of the dies to swage the metal of the original pipe into end walls rather than to cut it, as in an ordinary severing operation.

Metal pipe of the class most extensively used for gas manifolds is of the well-known commercial grade of steel or wrought-iron. Both the steel and the wrought-iron pipes are fabricated from flat metal stock which is rolled to cylindrical form and the meeting edges welded together. However, it is found that a certain percentage of the pipe, when closed by the spinning method above outlined, will leak when tested under gas or air pressure and that the leakage usually is present in the portion of the pipe seam which extends across the closed end of the pipe. This is due probably to the fact that the seam is slightly weaker than the body of the pipe and is disrupted by the torque forces imposed upon it by the spinning tool since the pipe is rotated at high speed while the spinning tool is forced against it and swages it by frictional engagement.

The present method and apparatus progressively swages the end closure without imposing a twisting force sufficient to disturb the welded seam. For this purpose, both the pipe and the swaging dies are rotated in the same direction at a lineal rate, which during part of the operation, is uniform; therefore, there is practically no torque force generated during the operation. Instead, by rolling the dies with the rotating pipe, the malleable wall sections are crowded progressively inward and finally rolled into a homogeneous mass as the constricting wall section is brought together and severed.

Other features and advantages of the invention will be more clearly apparent to those skilled in the art from the following detailed description of the invention taken in conjunction with the drawings which illustrate a preferred apparatus and mode of practicing the method.

*General arrangement*

The machine illustrated in the drawings represents a simplified, power driven but hand controlled apparatus for practicing the improved pipe closing method. It will be understood that the machine embodies the essential elements for performing the closing operation and that it is susceptible, without substantial change in design, to the application of automatic means for feeding the pipe lengths into the swaging dies, for heating the central zone of the pipes as they are fed in, and for engaging the pipes by power for rotation during the operation. However, the purpose of the present disclosure is to demonstrate the method and apparatus for executing the operation and the automatic equipment, being regarded as extraneous to that purpose, has been omitted for the sake of simplicity.

Figure 1:
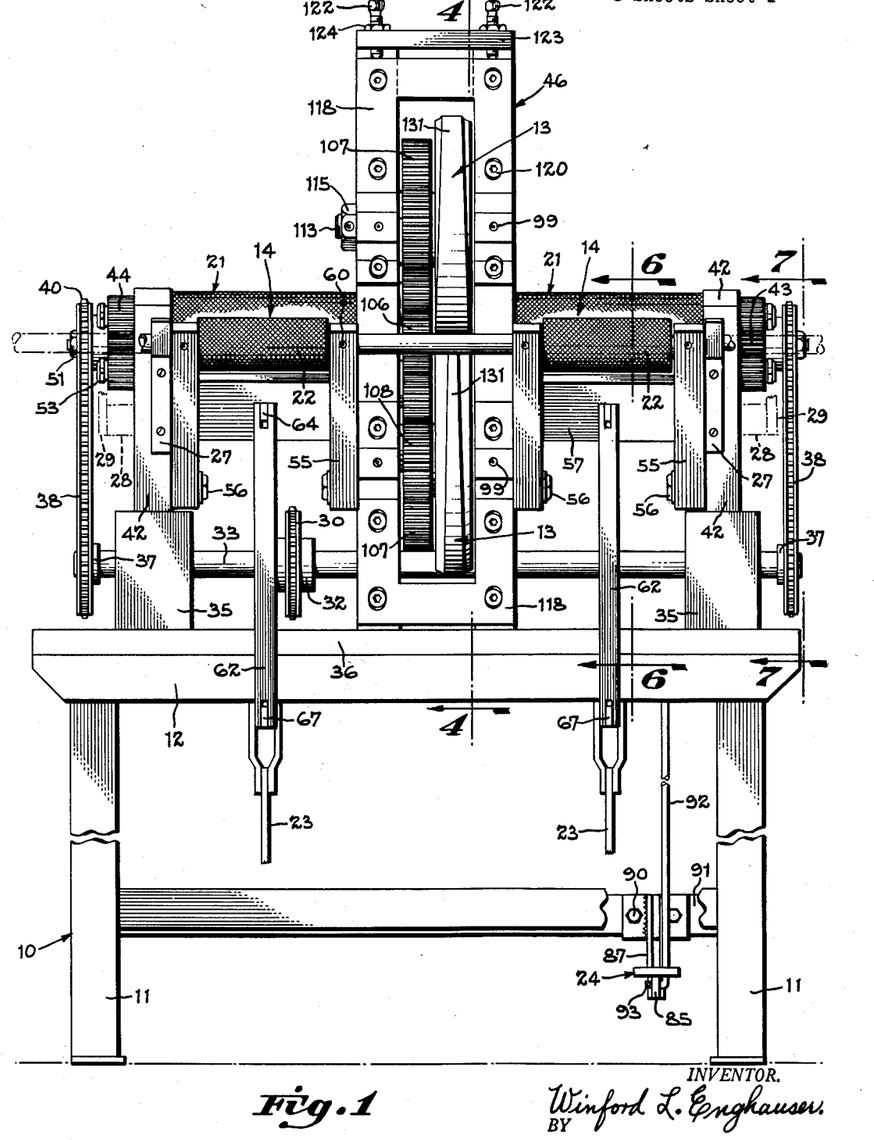
Figure 1 is a front elevation of the machine showing the general relationship of the various parts.
Figure 2:
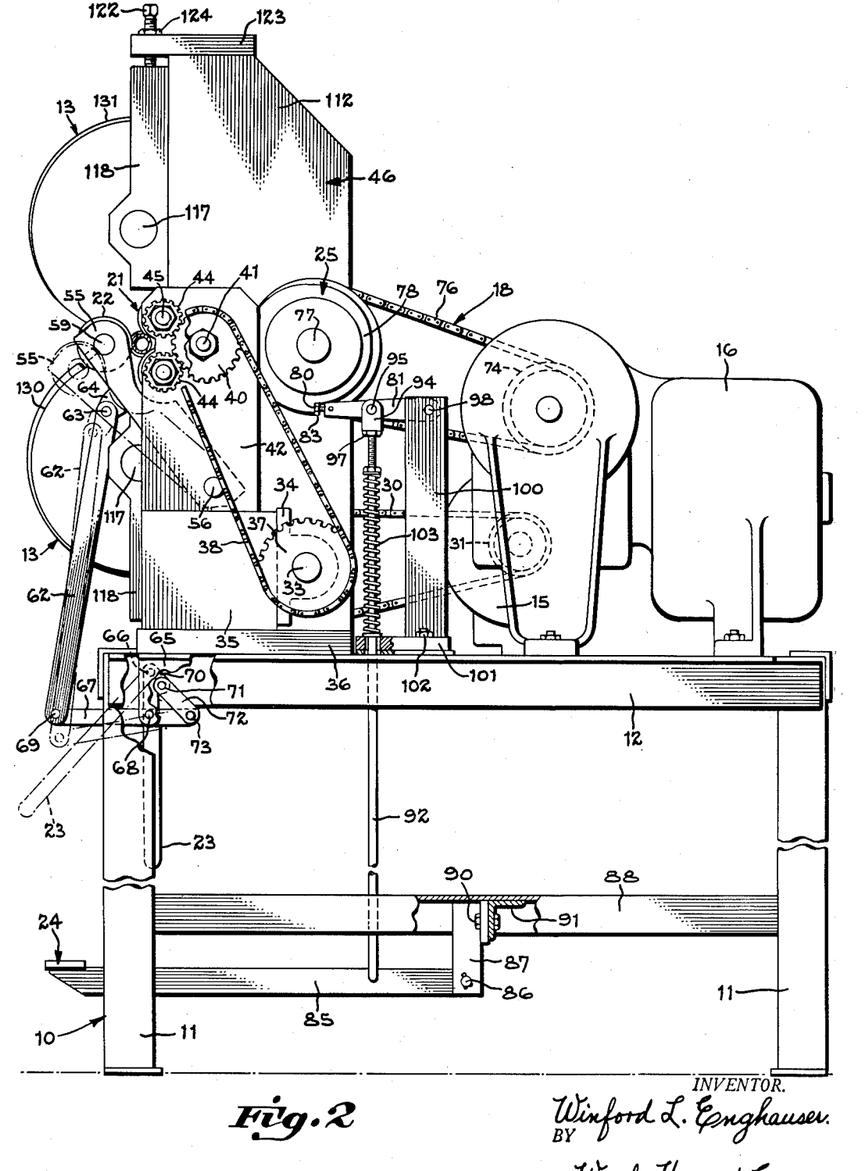
Figure 2 is a side elevation of the machine illustrated in Figure 1, further illustrating the general construction and arrangement of the organization.
Figure 3:
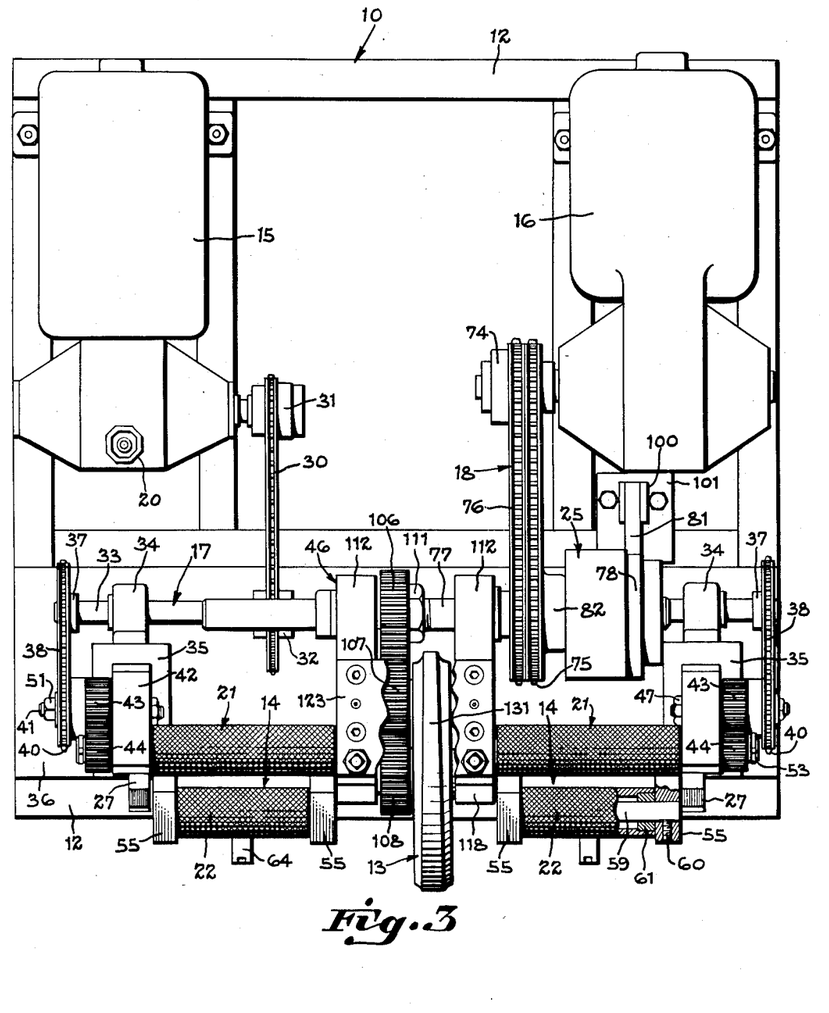
Figure 3 is a top plan view of the apparatus shown in Figures 1 and 2.

As best shown in Figures 1 to 3, the closing mechanism is mounted upon a frame work of welded construction, indicated generally at 10, constructed principally of structural angle irons, providing legs 11 and a mounting frame 12 upon which the components of the machine are secured. Essentially the machine consists of a pair of rotary swaging dies indicated generally at 13—13 and two spaced sets of pipe driving rollers generally indicated at 14. The roller systems are adapted to engage frictionally the cold outer portions of the pipe and impart rotation to it while the rotary dies engage and progressively close and sever the intermediate heated zone of the pipe. Both roller systems are axially aligned and are driven from a common source of power at uniform speed so as to rotate the pipe without transmitting any twisting force through the heated malleable central zone which is acted upon by the rotary swaging dies. The rollers are designated in this specification as regulating rollers since it is their function to regulate the speed of pipe rotation with respect to the rotation of the dies.

The regulating rollers are driven by a variable speed gear head motor indicated at 15, and the cooperating rotary swaging dies are driven by a similar motor indicated at 16. The drive extends from the motor 15 to the roller system by way of a transmission system indicated generally at 17, and a driving system generally indicated at 18 extends from the motor 16 to the rotary dies. The swaging dies are rotated in unison with one another in the same direction. The use of separate, independently controlled motors for the dies and rollers permits the speed of pipe rotation which is imparted by the regulating rollers, to be varied with respect to the speed of rotation of the swaging dies.

The motors 15 and 16 are well known commercial products and need not be disclosed in detail, but it is to be noted that motor 15 includes a speed change knob 20 which permits the roller speed to be regulated. As described in greater detail later in this specification, the rollers are driven at a speed which, during a part of the operation, rotates the pipe at a linear or surface speed somewhat greater than the surface speed of the swaging dies. This speed will vary in accordance with material, the diameter of the pipe and other factors and is best determined by experiment before the apparatus is placed in production for a given class of pipe.

Figure 6:
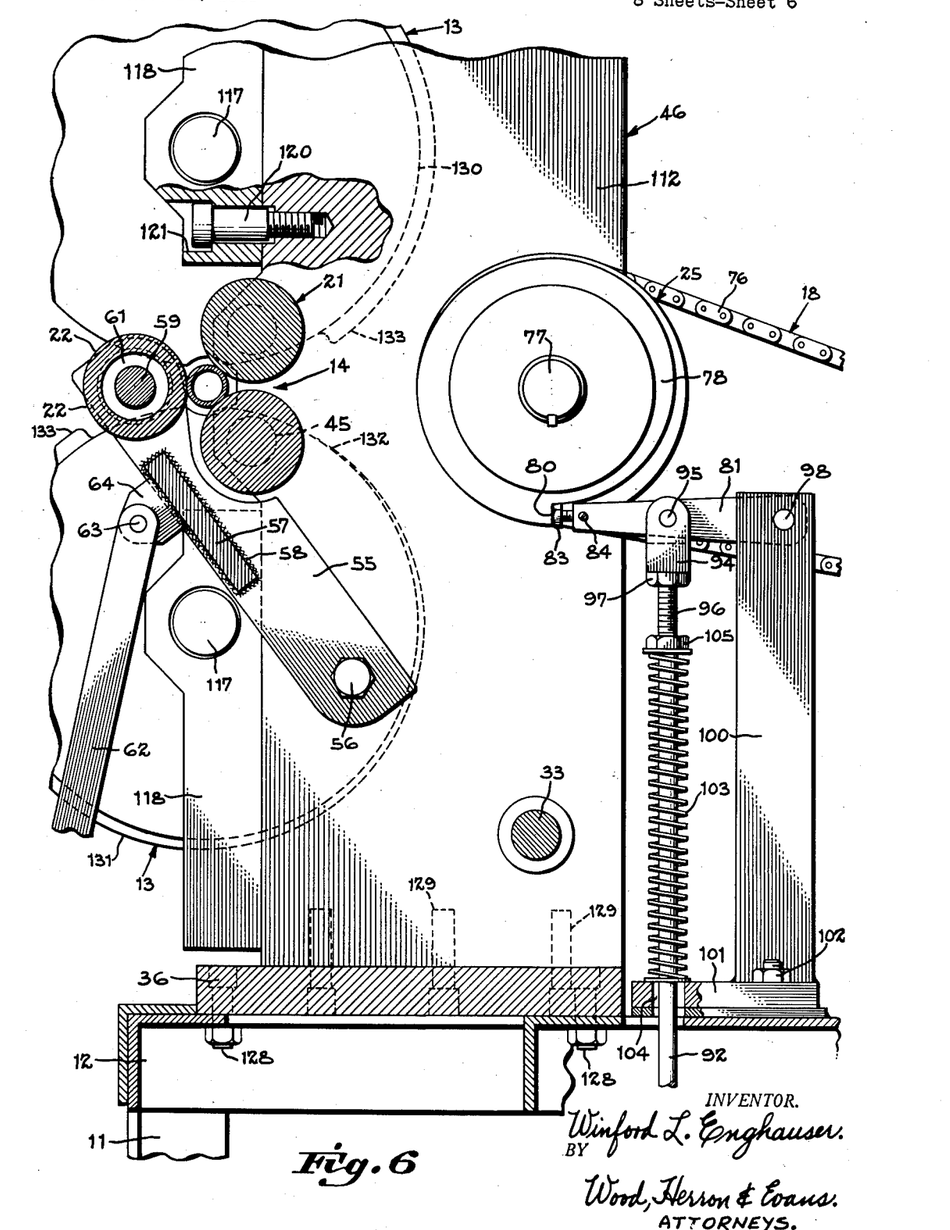
Figure 6 is an enlarged fragmentary sectional view taken on line 6—6, Figure 1, illustrating the arrangement of the regulating rollers and showing generally the single cycle clutch and control mechanism for rotating the swaging dies through single cycles of operation.

The apparatus is designed to produce closed pipes at a rapid production rate; however, as above noted, in the present simplified disclosure, the pipes are fed into the machine by hand and the cycles of operation are initiated by the operator each time the pipe is placed in operating position. As best shown in Figures 2 and 6, the regulating rollers are arranged in groups of three, each group being disposed laterally on opposite sides on the swaging dies so as to engage the endwise portion of the pipe with the heated portion passing between the swaging dies.

Each group of regulating rollers consists of a driven pair indicated generally at 21—21 and an idling roller 22 which is adapted to move laterally with respect to the driven rollers. As shown in Figure 2, the idler roller 22 is movable to the retracted position indicated in broken lines to permit the pipe to be inserted laterally between the dies. The idling roller is then moved into pressure engagement with the pipe to the position shown in full lines. In order to insure that rotary motion is imparted to the pipe, the surface of the regulating rollers is knurled as indicated. In the present disclosure, the idling rollers are shifted by hand operated toggle clamps, each having a hand lever 23.

After the opposite end portions of the pipe are engaged by the regulating rollers, the cycle of operation is initiated by depressing the treadle 24, arranged to trip a single cycle clutch 25 which forms a part of the driving system 18 leading from the motor 16 to the rotary swaging dies. Upon depressing the treadle, the swaging dies are rotated through one complete turn during which the closing and severing operation is completed. The dies are brought to a positive stop by the clutch at the end of the cycle of rotation with the pipe severed and with the severed ends closed. It will be noted at this point that the regulating rollers are driven continuously while the swaging dies rotate through individual cycles of operation each time the treadle 24 is depressed.

By way of illustration, a standard ¾" welded steel pipe has been selected in this disclosure of the method and operation of the machine. This nominal size has an outside diameter slightly over 1" and a wall thickness of approximately ⅛". It will be understood however, that the machine and method can be applied to practically any size or class of pipe without substantial change in the principle of operation. In producing closed pipes of the size illustrated, it has been found that for best results, the portion of the pipe which is to be constricted and closed should be heated approximately to 1800° F. and the pipe should be rotated by the regulating rollers in the same direction as the dies at a surface speed which, at the start of the operation, is approximately 25% faster than the surface speed of the dies. This speed is selected by adjusting the speed control knob 20 of the motor 15.

The arrangement of the dies is such that the apparatus illustrated will close pipes having an outside diameter smaller than 1″ without any change except to increase the speed of the rollers in order to maintain the surface speed relationship as above pointed out. Pipes of greater diameter are accommodated by installing dies having swaging surfaces suitable for the increased diameter and by appropriate adjustment of the regulating roller speed. The machine and method, within practical limits, are capable of executing the closing operation at a very rapid rate and to produce gas tight closures of uniform quality regardless of pipe size or wall thickness.

Figure 14:
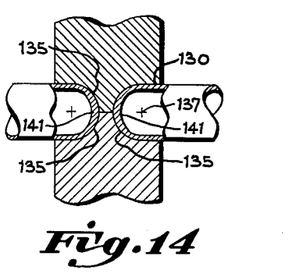
Figure 14 is a sectional view taken on line 14—14, Figure 13, illustrating the swaging operation at completion, the constricted portion of the pipe having been reduced to a solid and squeezed from the dies to form the end walls of the severed pipes.

As best shown in Figure 14, the swaging dies are configurated to produce a rounded end closure, but it will be apparent, from the detailed description of the dies, that other desired shapes, such as conical, can be produced by changing the profile configuration of the dies. It is to be noted from an inspection of Figure 14 that the progressive swaging action causes the thickness of the closure to be greatest in the center area. This area forms the seal and is developed when the constricting pipe wall is finally reduced to a solid mass and squeezed out from the dies during the final pinch-off operation; thus, the crowding naturally produces a homogeneous wall section in the critical area to provide a gas tight seal.

When the machine is in operation, motors 15 and 16 are operated continuously, the regulating rollers being driven continuously and the dies being rotated intermittently by operation of the single cycle clutch 25 as above noted. With the clamp lever 23 in unclamped position and the idling roller retracted, as shown in Figure 2, the pipe with its intermediate portion heated, is fed laterally into the throat 26 (Figure 4) which is defined by the spaced dies. The machine includes a pair of pipe support brackets 27—27 which are arranged to support the pipe in the position indicated in Figure 1 until the idling rollers are brought to bear against it. When the clamp levers 23—23 are actuated, the pipe is engaged by the idling roller and forced under pressure against the driven rollers 21—21, thus rotating the pipe while the dies remain stationary in their starting position.

In closing certain classes of pipe, it may be necessary to prevent elongation of the pipe length due to the progressive constriction of the malleable portion. For this purpose the machine may be provided with abutments arranged to engage the opposite ends of the rotating pipe. These abutments are indicated in broken lines in Figures 1 and 7 and in the form illustrated they consist simply of blocks 28 bolted to the vertical plate 42 and having vertical portions 29 which extend to the central axis of the pipe. The spacing of the abutments can be adjusted in any well known manner to provide closed pipes of desired length.

The clamping arrangement for the idling rollers is self-locking in the clamped position shown, and after having been clamped, the treadle 24 is depressed, causing the dies to execute their cycle of rotation. After the dies are brought to a stop by the clutch 25, the clamp levers 23 are shifted to the release position allowing the two severed and closed pipes to be removed from the machine.

The speed of rotation of the swaging dies is sufficiently great to provide approximately 60 cycles of operation per minute, disregarding the time delay between cycles for removing finished pipes and feeding in the stock. As noted above, the machine is intended to be used in conjunction with an automatic feeding mechanism which will heat the pipes and deliver them by gravity to the dies in the same manner as cylindrical parts are fed into centerless grinders. When so equipped, the feeding time will be greatly reduced and the machine will be capable of operation at a very rapid production rate.

*Regulating rollers*

Figure 4:
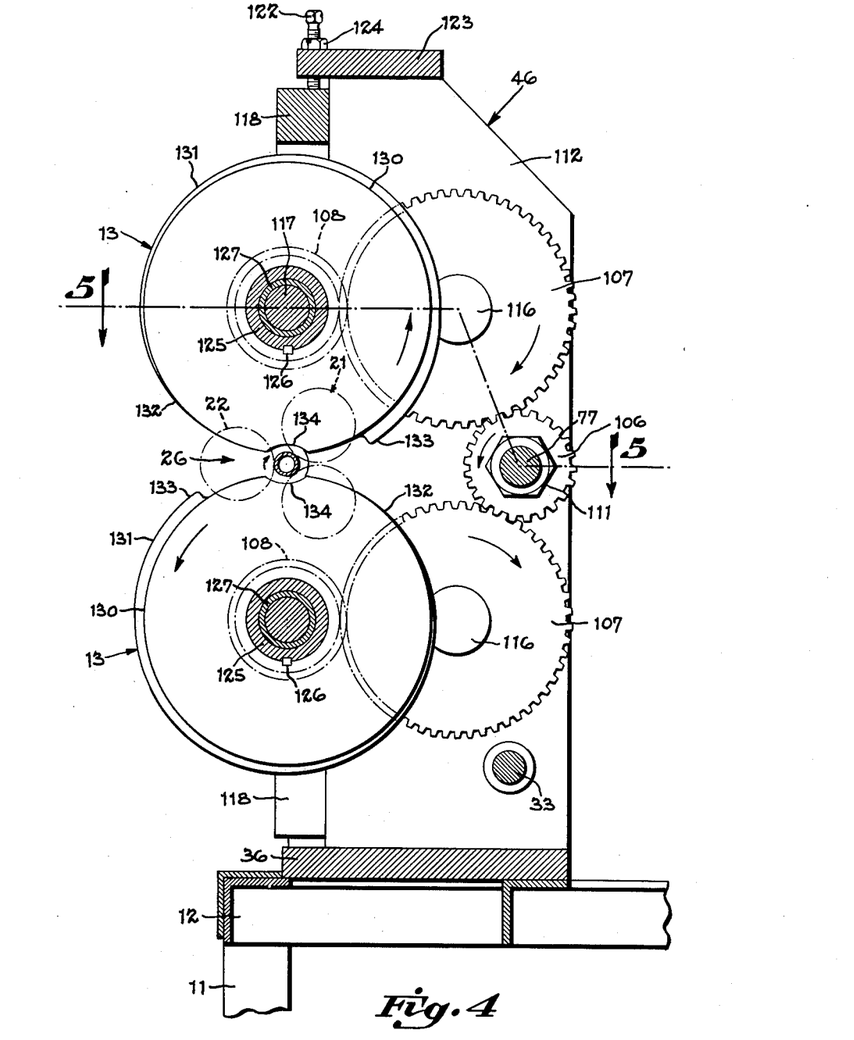
Figure 4 is an enlarged fragmentary sectional view taken on line 4—4, Figure 1, illustrating the swaging head, including the rotary swaging dies and gear train for driving them.

Described in detail (Figures 2 and 3), the regulating roller drive previously indicated at 17 includes a sprocket chain 30 extending from the drive sprocket 31 of the variable speed motor and driving a large sprocket 32 which is keyed to a drive shaft 33. Drive shaft 33 extends transversely of the machine and is journalled at opposite ends of the pillow bearings 34—34 which are mounted upon support blocks 35—35. Blocks 35 in turn are secured upon a base plate 36 which is mounted to the top frame 12 previously described. Drive shaft 33 drives both sets of rollers 21—21, having for this purpose a pair of sprockets 37—37 keyed to its opposite ends. As shown in Figure 4, drive shaft 33 passes through the swaging head 46, the walls being provided with bushings for intermediate bearing support.

Figure 7:
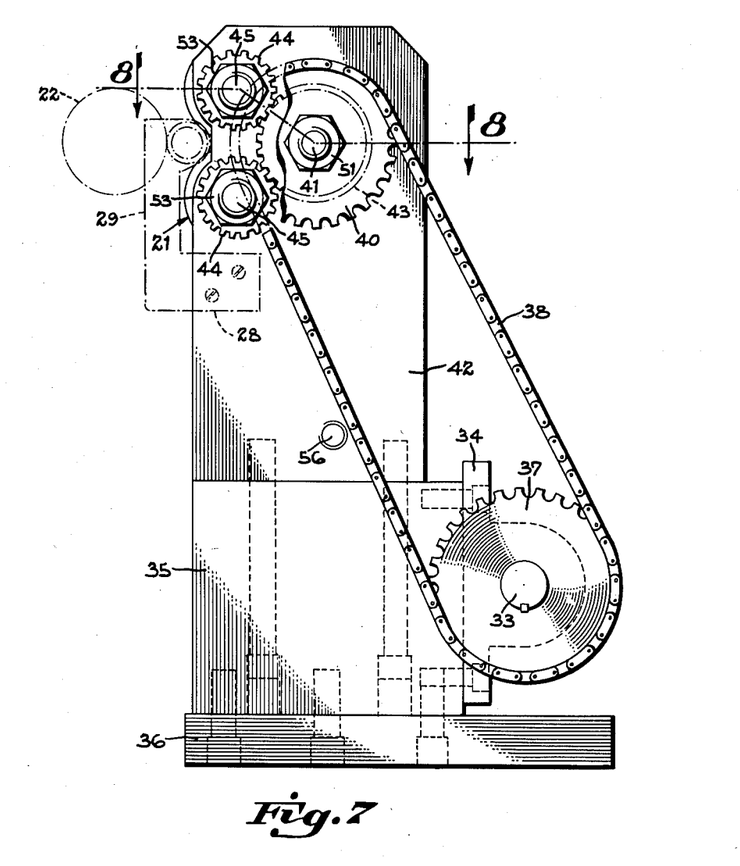
Figure 7 is a sectional view taken on line 7—7, Figure 1, illustrating the driving system for the regulating rollers.
Figure 8:
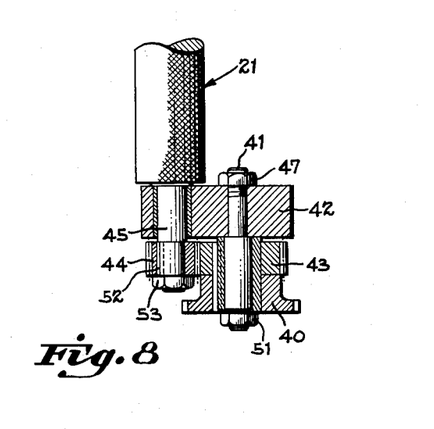
Figure 8 is a sectional view taken on line 8—8, Figure 7, further detailing the driving system for the regulating rollers.
Figure 9:
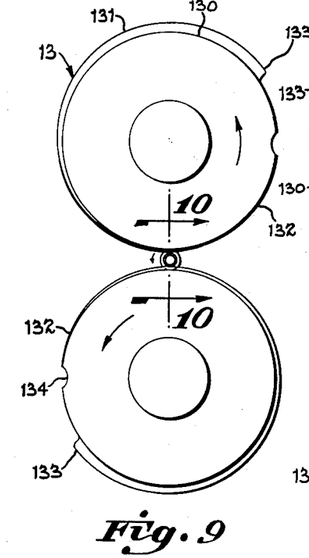
Figure 9 is a diagrammatic view of the swaging dies showing the operation of the dies with respect to a pipe at the beginning of the swaging operation.

As best shown in Figures 2 and 7, each sprocket 37 includes a sprocket chain 38 extending to a sprocket 40 which is rotatably mounted upon a stub shaft 41. Stub shaft 41 is mounted upon the upper portion of a vertical bearing plate 42 rising from the block 35 above noted. This construction is in duplicate for the respective groups of rollers at opposite sides. As detailed in Figure 8, each sprocket 40 includes a gear 43 which meshes in common with a pair of pinion gears 44—44 which are keyed to the shafts 45—45 extending from the drive rollers 21—21. As shown, the rollers are formed as integral parts of the shafts 45. The ends of the shafts opposite the pinion gears extend to and are journalled in the wall of the swaging head 46 which also journals the swaging dies.

The construction of the swaging head is described in detail later but it is to be noted at this point that it is provided at its forward edge with spaced bearing lugs journalling the ends of the drive roller shafts 45 (Figure 6). The driving system so far described is in duplicate for both sets of rollers 21—21 and it will be apparent that both sets will be driven in unison in the direction indicated in Figure 4 so long as the motor 15 is energized. As best detailed in Figure 8, the stub shaft 41 is shouldered and is mounted in the bearing plate 42 by means of a nut 47. It will also be noted in this view that the sprocket 40 and gear 43 are assembled and keyed together as a single unit and are maintained in position upon the stub shaft by the nut 51. The pinion gears 44 are keyed upon the roller shafts as at 52 and are locked in position by the nuts 53—53.

Each idler feed roller 22 is movably mounted between a spaced pair of swinging arm assemblies 55—55, the lower ends of the arms being pivotally mounted upon bolts 56—56. One of the bolts is threaded into the wall of the swaging head as shown in Figure 6 and the other is threaded into the vertical bearing plate 42 as shown in Figures 1 and 2. The spaced arms 55 are joined together by a cross plate 57 (Figures 1 and 6) which has its ends welded as at 58 to the respective arms to provide a rigid assembly. The idling roller is journalled upon a shaft 59 which is secured by means of set screws 60—60 threaded into the arm and engaged against the opposite ends of the shaft. As shown in Figure 3, the idling rollers are tubular and are loosely journalled upon the shaft 59 by means of the end plates 61 which are pressed into the opposite ends of the tubular roller 22.

Each swinging arm assembly 55 is connected to its clamp mechanism by means of a link 62 having its upper end pivotally mounted as at 63 upon a lug 64 which is welded in a central position to the cross plate 57 (Figure 2). The clamps are arranged to provide quick operation and are preferably toggle operated so as to remain in clamping position automatically.

Clamps of this type are commercially available and the form disclosed in Figure 2 consists of a bracket 65 which is secured upon the base plate 36, the actuating lever 23 being pivotally connected to the bracket as at 66. A clamp arm 67 which is pivotally connected as at 68 to the bracket has its outer end connected as at 69 to the lower end of link 62. The upper end of the actuating lever 23 includes a short toggle extension 70 which is pivotally connected as at 71 to a toggle link 72. The lower end of toggle link 78 is connected as at 73 to the end of the clamp arm 67 so that a toggle motion is produced by the articulated toggle. In the position shown in full lines in Figure 2, the toggle is in clamping position and when the lever 23 is pulled to the position shown in broken lines, the idling roller assembly will be shifted to the retracted position as shown.

*Swaging die driving system*

As best disclosed in Figures 2 and 3, the drive system previously indicated generally at 18 for rotating the swaging dies, consists of a double sprocket 74 mounted upon the drive shaft of the gear head motor 16, connected to a double sprocket 75 by means of double sprocket chains 76. In order to provide a single revolution of the swaging dies upon each cycle of operation, the driven sprocket 75 is loosely journalled upon the main drive shaft 77 and the driving connection from the sprocket to the shaft is provided by the single cycle clutch 25.

This clutch is a commercial structure and includes an eccentric clutch ring 78 which provides an offset 80 engageable by the clutch finger 81 (Figures 2 and 6). The hub 82 of sprocket 75 extends into and is connected to the driving element of the clutch. The arrangement is such that when the clutch finger 81 is shifted out of engagement with the offset 80 permitting the ring 78 to rotate, a positive driving engagement is established from sprocket hub 82 through the clutch to the drive shaft 77. In operation the treadle 24 is depressed momentarily to free the clutch ring and is then released so that the clutch finger rides upon the periphery of the ring and re-engages the offset upon completion of one cycle of rotation.

The gear train extending from the drive shaft 77 to the swaging dies produces one revolution of the dies upon each rotation of the clutch ring. In order to stop the swaging dies accurately at their starting position the clutch release finger 81 includes an adjustment screw 83 which projects from the swinging end of the finger into engagement with the offset 80. This screw is locked in adjusted position by a set screw 84 which is threaded in the finger and arranged to engage and lock the adjustment screw.

The clutch treadle 24 consists of a lever 85 having its rearward end pivotally mounted as at 86 upon a bracket 87 which depends downwardly from a frame structure 88 forming a part of the base structure (Figure 2). The bracket 87 is bolted as at 90 to an angle iron 91. The treadle is connected by a pull rod 92 to the clutch release finger 81. The lower end of the pull rod is bent at right angles to provide a pivotal connection 93 passing through the lever 85 and the upper end of the pull rod includes a clevis 94 pivotally connected to the release finger by the pivot pin 95. The upper end of the pull rod is threaded as at 96 to provide an adjustable connection with the clevis and a lock nut 97 locks the clevis in adjusted position.

The release finger is pivotally mounted as at 98 to the upper end of a bracket 100 and the lower end of the bracket includes a mounting plate 101 secured by bolts 102 to the frame 12 as shown in Figures 2 and 6. The release finger is normally urged upwardly by the compression spring 103 surrounding the pull rod 92 and having its lower end seated upon the mounting plate 101, the plate having a hole 104 through which the pull rod passes. The upper end of the compression spring is seated against a nut 105 screwed upon the threaded portion 96. Depression of the treadle thus will disengage the clutch finger against the bias of spring 103 and upon release of the treadle the spring will urge the finger and treadle to the normal clutch arresting position.

The rotation of shaft 77 is transmitted to both swaging dies in the same direction by a gear train as indicated in Figure 4. Shaft 77 includes a pinion 106 meshing with a pair of gears 107—107. Gears 107 in turn mesh with respective pinions 108—108, the pinion 108 being equal in pitch diameter to the pinion gear 106 so that a single rotation of pinion 106 will provide one revolution of the swaging dies in the same direction as indicated by the arrows. It will also be noted at this point that the swaging dies rotate in the same lineal direction as the pipe except that the pipe preferably is rotated at a surface speed greater than the swaging dies as explained later.

Figure 5:
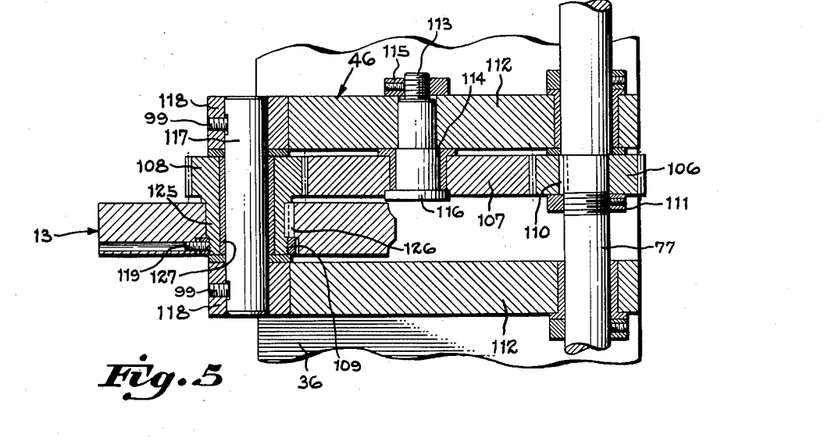
Figure 5 is a sectional view taken on line 5—5, Figure 4, detailing the mounting of one of the swaging dies and the gear train.

The gear train and mounting arrangement of the dies is shown in detail in Figure 5. It will be noted in this view that the pinion 106 is keyed upon shaft 77 as indicated at 110 and is locked upon the shaft by the lock nut 111. Drive shaft 77 is journalled in the side walls 112—112 of the swaging head 46 and the idler gears 107—107 are loosely journalled upon the stub shafts 113 also mounted in the side plates 112. The stub shafts are shouldered as at 114 and are secured in the side plate by means of the nuts 115. The opposite ends of the stub shafts are provided with heads 116 to confine the gears upon the shafts.

Figures 11, 13:
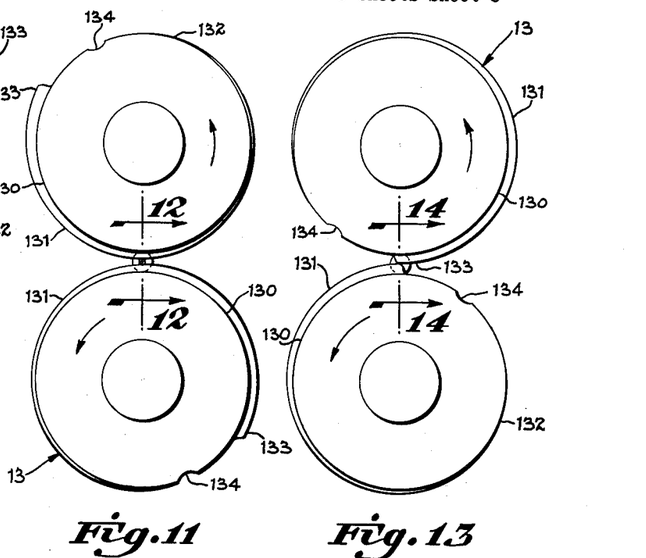
Figure 11 is a diagrammatic view similar to Figure 9 illustrating the swaging dies at a further stage in the operation.
Figure 13 is a diagrammatic view showing the swaging dies at completion of the operation.

The pinions 108 and the swaging dies 13 are rotatably mounted upon stub shafts 117—117, the outer ends of each shaft being supported by a slideable bearing block 118—118. The bearing blocks are secured by a series of socket head screws 120 (Figure 6), which pass through the bearing blocks into the spaced side plates for support. In order to provide adjustment, the bores for the socket head screws are elongated as at 121 and the upper end of the bearing block is engaged by a pair of adjustment screws 122—122 passing in threaded engagement through a cross plate 123 which is secured upon the upper ends of the side plates 112. The set screws 122 are locked in adjusted position by the nuts 124. This arrangement allows the upper swaging die to be adjusted vertically with respect to the lower die to a position which brings the swaging fins into engagement at the end of the closing operation as indicated in Figures 13 and 14. The set screws 122—122 prevent the upper swaging die from being forced upwardly by the force developed during the swaging operation.

As shown in Figure 5, the pinion 108 of each die includes a driving hub 125 passing into a bore formed in the swaging die and keyed as at 126 to the die. A bearing liner 127 preferably is interposed between the shaft 117 and sleeve 125 to reduce friction and to eliminate excessive wear. The shaft 117 is locked axially in the bearing blocks by set screws 99 threaded through the blocks and engaging flats formed in the end portions of the shafts. The swaging dies are held against axial displacement on the driving hubs by lock nuts 109 which are locked in position by the set screws 119. The lower ends of the side plates 112—112 are bolted as at 129 to the base plate 36 which in turn is secured by bolts 128 to the frame 12 (Figure 6). It will be noted that the arrangement of the slideable bearing blocks and side plates equalizes the forces imposed upon the shafts 117—117 during the swaging operation and that these forces are resisted directly by the swaging head assembly as a self-contained unit.

*Construction and operation of dies*

As best disclosed in Figures 4 and 9 to 16, the swaging dies 13—13 are of duplicate construction and during a cycle of operation they are both driven in the same direction so that their surfaces move lineally in the same direction as the rotating pipe. Each die consists of a circular disk providing a tracking surface 130 having a substantial width (Figure 10) and the spiral swaging fin or lobe 131 rises centrally from the tracking surface. The fin 131 has a leading end 132 in the sense of direction of rotation, which blends into the circular tracking surface and has a constant rise terminating at the trailing or pinch-off end as indicated at 133.

The two dies are so related to one another that in starting position, the leading end 132 of the upper die resides above the throat 26 and the trailing end 133 of the lower die occupies a corresponding position below the throat (Figure 4). The dies will perform the same operation if the relationship of the swaging fins and direction of rotation is reversed, that is with the trailing end of the upper die located above the throat, but it is found that feeding the pipes laterally into the throat can best be accomplished with the arrangement disclosed.

It will be noted in Figure 4 that there is provided a complementary circular recess 134 in the tracking surface of each swaging die, located approximately midway between the leading and trailing ends of the swaging fin. When the dies are in their starting position as shown, the recesses 134 are in alignment with one another to provide a clearance area surrounding the rotating pipe. It will also be observed that the tracking surfaces of the two dies are spaced apart sufficiently to admit the pipe as it is fed laterally into operating position within the regulating rollers. After the pipe is fed in and its end portions engaged by the idling rollers 22—22, it will rotate with respect to the stationary swaging dies until the cycle of operation is initiated. When the dies begin to rotate, the leading ends 132—132 of both fins will engage the periphery of the pipe in the heated zone and begin the progressive constricting operation indicated diagrammatically in Figures 9 to 14.

The dies are constructed preferably of tool steel, hardened and ground to a fine finish in order to impart a smooth surface to the closed portions of the pipe. In practice, it has been found that the dies can be most readily constructed by turning them on a lathe and forming a blanked out concentric rib upon the periphery at center, with curved fillets 135—135 (Figure 14) joining the rib to the periphery of the disk and blending into the tracking surface 130.

After the blank is formed, the concentric rib is reduced to spiral lobe form by an eccentric grinding operation, causing the rib to spiral from its leading end progressively outward from the center of the disk to its full height at the trailing end. In the present disclosure, the rib has a uniform cross section which flares in a curve outwardly as defined by the curved fillets 135—135; due to this profile, the spiral grinding operation will produce in cross section a flat face 136 which converges in width from the leading end to its trailing end. In other words, the leading end of the lobe is delineated in width by the intersection of the face 136 with the curves of the fillets. The spiral face starts at the periphery of the disk and produces a constant rise at points about the circumference of the disk. However, the curving fillets decrease outwardly in width at a nonuniform rate since they start tangent to the periphery of the disk and curve inwardly toward one another as they rise. Therefore, the intersection of the spiral face with the curving fillets causes the width of the spiral face to converge in lines which curve toward each other. The curvature is greatest at the leading end and gradually diminishes toward the trailing end as depicted generally by the curved outline shown in Figure 16 which represents a developed face view of the lobe.

It will be apparent, however, that if the lobe were provided with straight tapering sides instead of fillets, then the width of the face would converge along straight lines. It will be understood that the present method is not limited to the formation of curved ends and that the profile of the lobes will be varied in accordance with the desired configuration.

Figure 15:
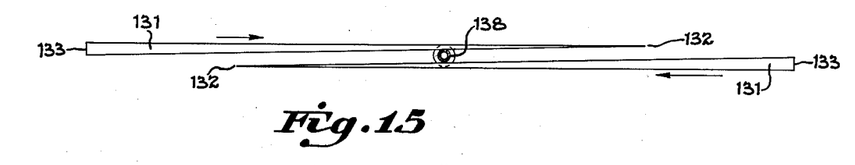
Figure 15 is a diagrammatic view illustrating the developed length of the cooperating swaging lobes at an intermediate stage of operation, illustrating the constant rise of the lobes.
Figure 16:
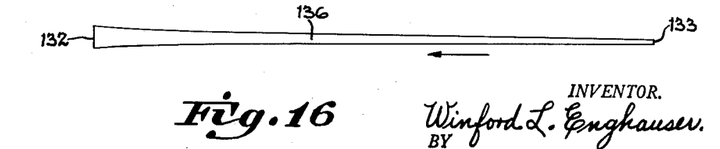
Figure 16 is a diagrammatic view projected from Figure 15 showing the progressive decrease in the width of the swaging lobes.

As shown diagrammatically in Figure 15, the swaging fins cooperate with one another in a manner similar to a pair of elongated wedging surfaces moving toward one another at uniform rates of movement with the pipe interposed between them. The width converging face of one of the fins, depicted in Figure 16, is projected from the right hand fin of Figure 15 but it will be understood that the convergence is in duplicate for both swaging fins or lobes.

Figure 10:
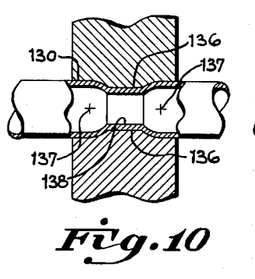
Figure 10 is an enlarged sectional view taken on line 10—10, Figure 9, illustrating the constriction of the pipe and formation of the end closure walls in the early stages of the swaging operation corresponding to that shown in Figure 9.
Figure 12:
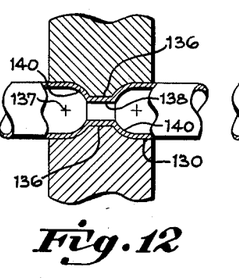
Figure 12 is a sectional view taken on line 12—12, Figure 11, illustrating the formation of the pipe at the stage of operation corresponding to Figure 11.

Referring now to Figures 10, 12 and 14, the center points indicated at 137—137 represent the centers from which the radii of the curved fillets are described. It will be observed that these points are located in the same plane horizontally and that each point is common to the complementary fillets of the cooperating dies; moreover, the location of these two points radially from the center of rotation of the dies is the same throughout the entire circumference of the dies. Therefore, the fillets progressively develop from the tracking surfaces with respect to the pipe during rotation of the dies and the surface of the fillets, which is in contact with the pipe, simply increases in extent while the width of the tracking faces 136 diminishes. By developing the swaging fins in this manner, a given point on the rotating pipe will receive a number of impressions from the fillets, one for each rotation of the pipe and this improves the surface finish of the rounded pipe ends.

Thus, as indicated in Figure 10, at the beginning of the swaging operation the faces 136—136 begin to constrict the malleable portion of the pipe for a substantial lineal extent as indicated at 138 and the fillets begin to round it. It will be observed in Figure 12 at a further stage in the operation, that both fillets have progressed from the same centers 137 and have thus developed the rounded portions 140—140 as the cooperating fillets extend themselves further toward the constricting center of the pipe. It will also be noted that the centers of the fillets are located outwardly from the periphery of the disk in a plane which passes across on top of the fin at the trailing end 133 so that when the trailing ends perform the final pinch-off operation, the semi-circular fillets will have completely rounded the closed ends of the pipe as shown in Figure 14.

Since the metal, which from the pipe wall is constricted has been crowded back into the pipe, the rounded ends 140 (Figure 14) become progressively thicker toward center as indicated at 141, due to the pinch-off at the end of the cycle. This increased wall section is formed by the excess metal of the constriction which is displaced outwardly during the final stages and pinch-off; hence, the metal is united under pressure and becomes more dense in order to provide a gas tight seal.

In closing standard welded iron pipe by the spinning method practiced in the past, it was found that leakage was most likely to occur in the welded seam. This is probably due to weakness in the seam or to impurities entrained in the weld, causing rupture under the twisting force imposed by the spinning tool.

In practicing the present method, this twisting force, for practical purposes, is eliminated since the two end portions of the pipe are engaged and rotated in unison by the regulating rollers. A limited amount of turning resistance is imparted to the malleable portion of the pipe due to the difference in surface speeds of the pipe and dies but this is not sufficient to cause any rupture of the seam. It has been determined by experiment that for the pipe diameter illustrated, the pipe should be rotated at a speed which provides approximately 25% greater surface or lineal speed than the dies at the start of the operation. It will be apparent, that as the constriction progresses, the surface speed of the constriction with respect to the dies will decrease and at some point toward the end of the cycle, the surface speed of the die will be greater than the surface speed of the constriction. This speed relationship is found to produce a gas tight closure and a smooth finish on the rounded ends.

It will be understood that several factors enter into the determination of the best regulating speed and that it is varied for different pipes, as indicated by experiment, by adjusting the speed regulating knob 20 of motor 15. If necessary, the lineal speed of the pipe can be held approximately constant with respect to die speed, by progressively increasing the motor speed during each cycle of operation.

Having described my invention, I claim:

1. A machine for forming two closed end pipes by progressively constricting and severing an intermediate heated malleable portion of the pipe comprising, a swaging head, a pair of swaging discs rotatable in the same direction, each disc having a pipe swaging lobe extending partially around its circumference and spiraling outwardly in the direction of rotation of said disc, said spiral lobe having a leading end and a flat-faced trailing portion of substantial width displaced outwardly from said circumference, the disc having an inactive sector adjacent said trailing portion, respective bearing means on the swaging head journalling said discs for rotation in a common plane, said discs normally residing in a stationary position with the respective inactive sectors facing one another in spaced relationship to receive a length of pipe with the ends thereof extending outwardly from opposite sides of the discs, the flat-faced trailing portions of said lobe tracking against one another during rotation of the discs, respective sets of regulating rollers rotatably journalled on opposite sides of said swaging discs in positions to track upon the periphery of a pipe extending from opposite sides of the discs, power means connected to said regulating rollers for rotating the rollers in the same direction at a constant surface speed, a second power means in common driving connection with the respective swaging discs for rotating the discs in the same direction and at lower surface speed than said regulating rollers for a single cycle of rotation, thereby to track the spiral swaging lobes against the periphery of the rotating pipe from opposite sides to progressively constrict and sever the malleable portion of the pipe as the flat-faced trailing portions of the lobe track against one another at completion of said cycle of rotation.

2. A machine for forming two closed end pipes by progressively constricting and severing an intermediate heated malleable portion of the pipe comprising, a swaging head, a pair of swaging discs rotatable in the same direction, each disc having a pipe swaging lobe extending partially around its circumference and spiraling outwardly in the direction of rotation of said disc, said spiral lobe having a leading end and having a trailing end portion displaced outwardly from said circumference, the disc having an inactive sector adjacent said trailing end portion, the lobe having a flat tracking surface which diminishes in width from the leading to the trailing end thereof, respective bearing means on the swaging head journalling said discs for rotation in a common plane, said discs normally residing in a stationary position with the respective inactive sectors facing one another in spaced relationship to receive a length of pipe with the ends thereof extending transversely from opposite sides of the discs, the flat tracking surfaces of the trailing end portions tracking against one another during rotation of the discs, respective pairs of regulating rollers rotatably journalled on opposite sides of said swaging discs in position to track against a length of pipe extending from the discs, an idler roller for each pair of regulating rollers, respective clamp elements rotatably journalling the idler rollers, said clamp elements advancing the idler rollers toward the regulating rollers to force a length of pipe thereagainst and retracting the idler rollers to provide an opening for advancing the pipe laterally to the regulating rollers, power means connected to said pairs regulating rollers for rotating the rollers in the same direction at a constant surface speed, a second power means in common driving connection with the respective swaging discs for rotating the discs in the same direction and at a lower surface speed than said regulating rollers for a single cycle of rotation, thereby to track the spiral swaging lobes against the periphery of the rotating pipe from opposite sides to progressively constrict and sever the malleable portion of the pipe as the trailing ends of the lobe track against one another at completion of said cycle of rotation.

3. A machine for forming two closed end pipes by progressively constricting and severing an intermediate malleable portion of the pipe comprising, a swaging head, a pair of rotatable swaging discs mounted on said head for rotation in a common plane and in the same direction, each of said discs having a flat-faced swaging lobe extending partially around the circumference thereof and spiraling outwardly in the direction of rotation of the discs, said spiral lobe having a leading end and having a trailing end portion of substantial width displaced outwardly from said circumference, said trailing end portions tracking against one another during rotation of the discs, said disc having an inactive sector adjacent said trailing end portion and residing normally in a stationary position with said inactive sectors facing one another in spaced relationship to receive a length of pipe therebetween with the opposite ends thereof projecting transversely from opposite sides of the discs, respective sets of regulating rollers at opposite sides of said swaging discs, bearing means journalling said rollers upon respective axes of rotation parallel with the longitudinal axes of a length of pipe residing between said discs, the axes of said rollers spaced radially from one another to track said rollers against the periphery of the pipe, power means connected in common to said regulating rollers for rotating the rollers in the same direction at a constant surface speed, a single cycle clutch in common driving connection with the swaging discs, a second power means in driving connection with said clutch, a control element on said clutch normally arresting the same with the discs in said stationary position, said clutch upon release rotating the discs respectively in the same direction and at a lower surface speed than said regulating rollers for a single cycle of rotation, thereby to track the spiral swaging lobes against the periphery of the pipe from opposite sides to progressively constrict and sever the malleable portion thereof as said trailing portions track against one another at completion of said cycle of rotation.

References Cited in the file of this patent

UNITED STATES PATENTS

| 501,547 | Thomson | July 18, 1893 |
| 509,730 | Griffin | Nov. 28, 1893 |
| 1,353,982 | Bailey | Sept. 28, 1920 |

FOREIGN PATENTS

| 833,936 | France | Nov. 4, 1938 |
| 839,821 | France | Apr. 13, 1939 |